UNITED STATES PATENT OFFICE.

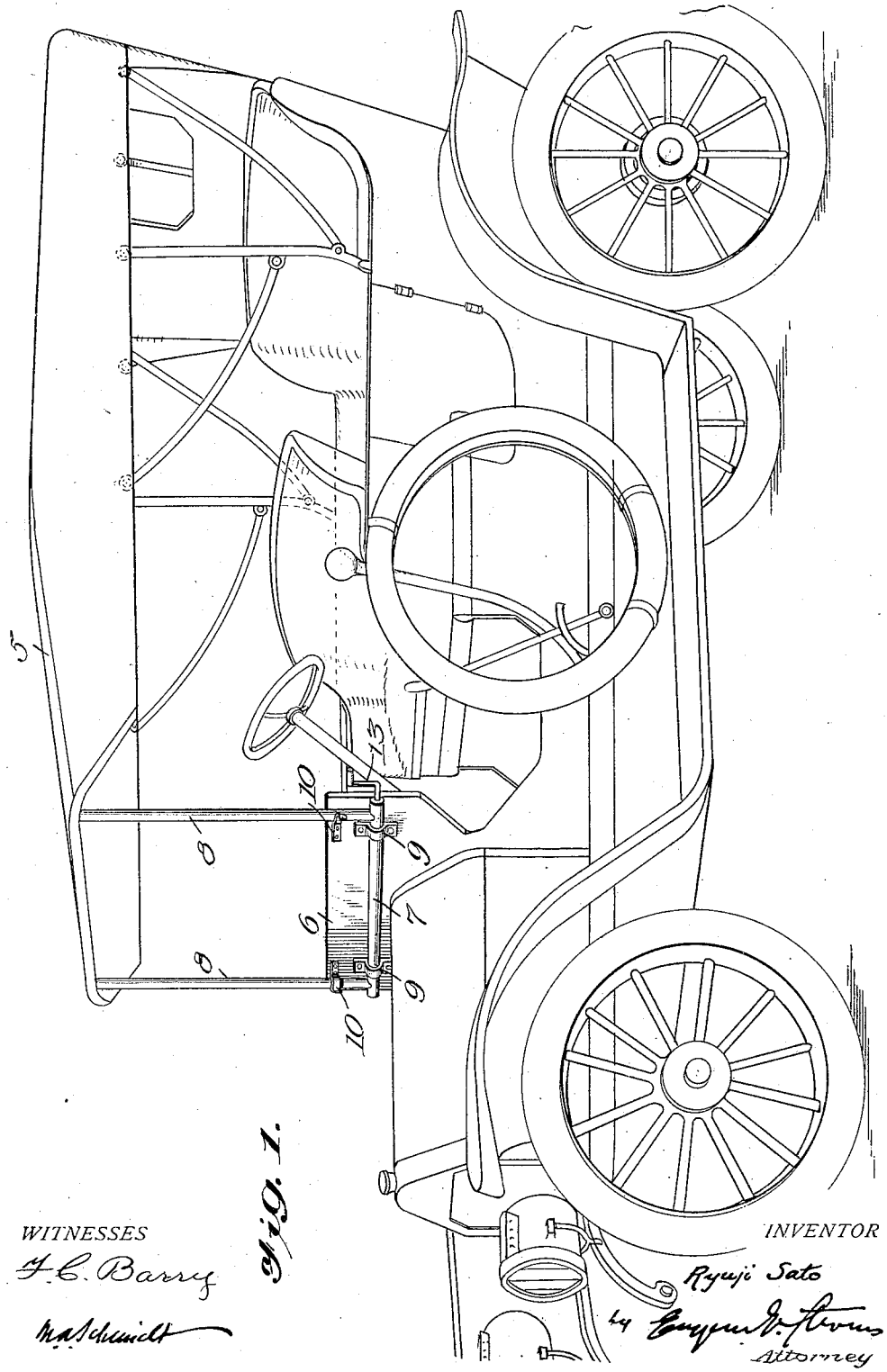

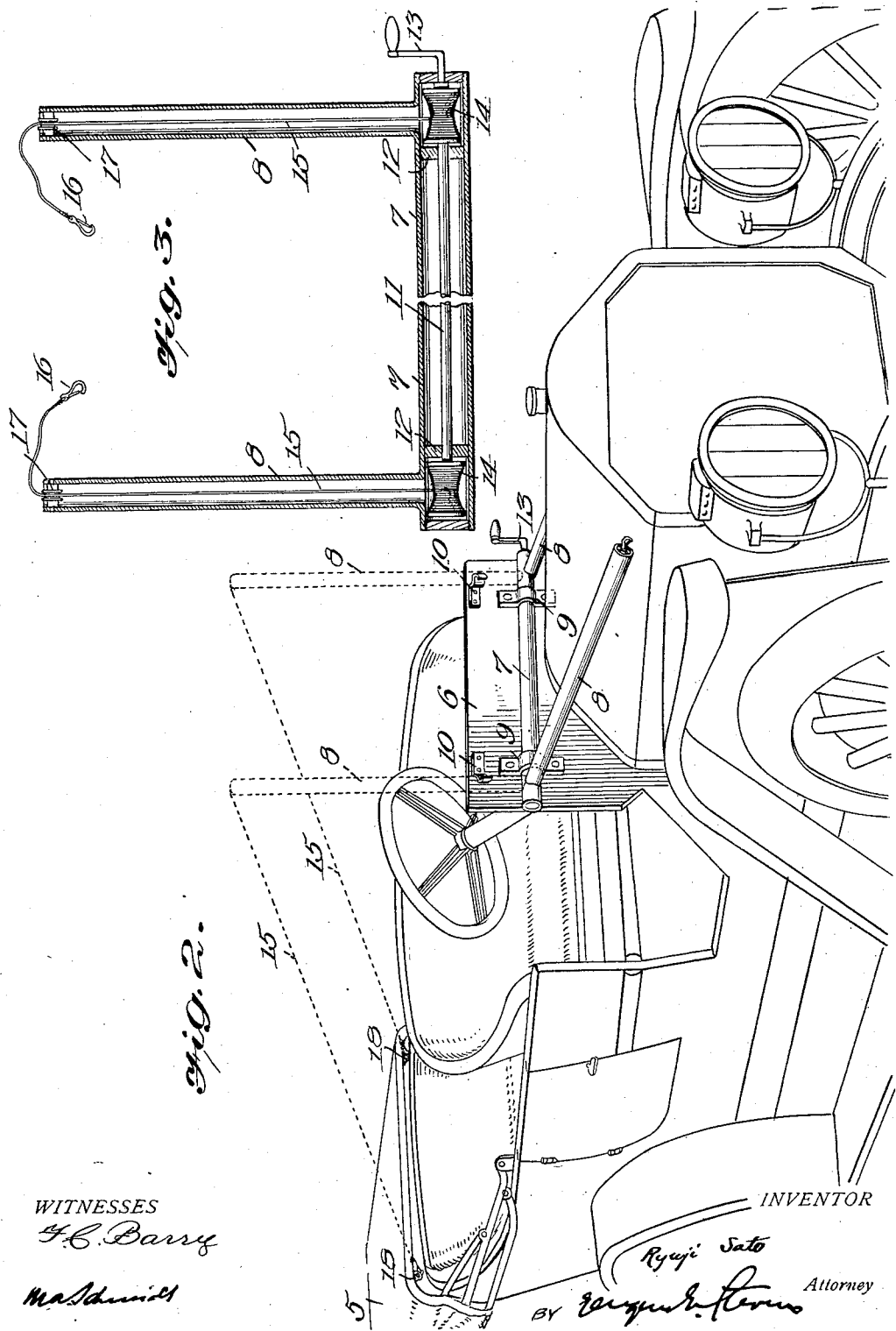

RYUJI SATO, OF CHICAGO, ILLINOIS.

VEHICLE TOP-RAISING DEVICE.

1,082,706.

Specification of Letters Patent.     Patented Dec. 30, 1913.

Application filed November 16, 1912.   Serial No. 731,331.

*To all whom it may concern:*

Be it known that I, RYUJI SATO, a subject of the Emperor of Japan, residing at Chicago, in the county of Cook and State of Illinois, have invented certain new and useful Improvements in Vehicle Top-Raising Devices, of which the following is a specification.

This invention relates to devices for raising the tops of vehicles, it being especially designed for use in connection with automobiles, the tops of which are large and unwieldy, which makes them hard to raise.

The object of the invention is to provide a device of the kind stated which is simple in construction and which can be easily operated.

The invention also has for its object to provide a structure which enables the device to be readily applied to the vehicle without altering or modifying the structure of the same.

These objects are attained by a novel combination and arrangement of parts to be hereinafter described and claimed, reference being had to the accompanying drawings, in which—

Figure 1 is a perspective view showing the application of the invention, the top being shown raised. Fig. 2 is a perspective view showing the position of the parts when the top is lowered. Fig. 3 is a sectional detail of the device.

In the drawings, 5 denotes the vehicle top which is to be operated by the device forming the subject matter of the invention.

The top is shown applied to an automobile, but it is to be understood that the invention is not limited to automobile tops, but may be applied to the tops of other vehicles.

The top is carried by bows which are arranged in the ordinary manner so that the top may be folded and lowered when not in use.

The structure of the top is immaterial and forms no part of the invention, in view of which, a detailed description of such structure is deemed unnecessary.

On the dashboard 6 of the vehicle, in front thereof, is mounted a transverse horizontal tube 7 having adjacent to its ends outstanding arms 8 which are tubular and extend at right angles to the tube, and the latter is supported in suitable bearings 9 mounted on the dashboard. The tube is loose in its bearings and is therefore free to be rocked therein, so that the arms may be swung in a vertical plane into erect position as shown in Fig. 1, or downward as shown in Fig. 2. On the dashboard are clips 10 for holding the arms in erect position.

Mounted axially in the tube 7 is a shaft 11, the same being supported in suitable bearing 12. One end of the shaft extends from the corresponding end of the tube and has a crank-handle 13, whereby the shaft is adapted to be rotated.

On the shaft 11, in line with the arms 8, are made fast spools 14 on which are adapted to be wound hauling lines 15 which pass through the arms and carry snap-hooks or other suitable fasteners 16 at their free ends. Inside the arms, adjacent to the outer ends thereof, are mounted pulleys 17 over which the hauling lines pass. The fasteners 16 prevent the hauling lines from being drawn too far into the arms if the crank-handle should be turned too far. To the front portion of the top 5 are secured rings 18 for attachment of the hauling lines 15, which is done by engaging the fasteners 16 with said rings. The hauling lines may thus be detachably connected to the top.

The operation of the device is as follows: When the top 5 is in folded and lowered position, the arms 8 may be swung down to extend forward from the dashboard 6, as shown in Fig. 2, in which position they are lowered out of the way. If it is desired to raise the top, the arms are swung upward into erect position, as shown by dotted lines in Fig. 2, and they are made fast in this position by the devices 10. The hauling lines 15 are now withdrawn and made fast to the top, and the crank-handle 13 is operated to wind the hauling lines on the spools 14, whereupon the top is raised, the crank-handle being operated until the top assumes the position shown in Fig. 1, its forward end resting on top of the arms. To lower the top, it is necessary only to disconnect the hauling lines, and the device may then also be swung down out of the way as shown in Fig. 2.

With the tops in use at the present time, it is often extremely difficult to raise the same, as a pull on one side will often not budge the other side, especially when the top is wet. This difficulty is entirely obviated by the herein described device, and the top can be easily raised, the hauling lines pulling evenly on both sides of the top. The device can also be easily applied and no change in the structure of the top or the vehicle is necessary.

I claim:

1. The combination with a foldable vehicle top; of vertically swinging arms carried by the vehicle, hauling lines associated with said arms and adapted to be extended from the extremities thereof to the vehicle top, means for connecting said extending ends of the hauling lines to the vehicle top, and winding devices carried by the swinging arms to which devices the other ends of the hauling lines are connected.

2. The combination with a foldable vehicle top; of vertically swinging arms carried by the vehicle and adapted to support the forward end of the top when the latter is in raised position, hauling lines associated with said arms and adapted to be extended from the extremities thereof to the vehicle top, means for connecting said extending ends of the hauling lines to the vehicle top, and winding devices carried by the swinging arms to which devices the other ends of the hauling lines are connected.

3. The combination with a foldable vehicle top; of vertical arms carried by the vehicle and adapted to support the forward end of the top when the latter is in raised position, hauling lines associated with said arms and adapted to be extended from the extremities thereof to the vehicle top, means for connecting said extending ends of the hauling lines to the vehicle top, and winding devices carried by the vertical arms, to which devices the other ends of the hauling lines are connected.

4. The combination with a foldable vehicle top; of vertical arms carried by the vehicle, hauling lines associated with said arms and adapted to be extended from the extremities thereof to the vehicle top, means for connecting said extending ends of the hauling line to the vehicle top, and winding devices carried by the vertical arms, to which devices the other ends of the hauling lines are connected.

5. The combination with a foldable vehicle top; of a horizontal rockable tube carried by the vehicle, tubular arms extending from the tube, a shaft mounted axially in the tube, means for operating the shaft, spools on the shaft, hauling lines wound on the spools and passing through the tubular arms to extend therefrom, and means for connecting the hauling lines to the top.

In testimony whereof I affix my signature in presence of two witnesses.

RYUJI SATO.

Witnesses:
S. J. LEHRER,
H. G. BATCHELOR.

---

Copies of this patent may be obtained for five cents each, by addressing the "Commissioner of Patents, Washington, D. C."